Sept. 18, 1923.
L. L. CARTER
1,468,193
GAS AND WATER SEPARATOR FOR OIL WELLS
Filed Jan. 16, 1922
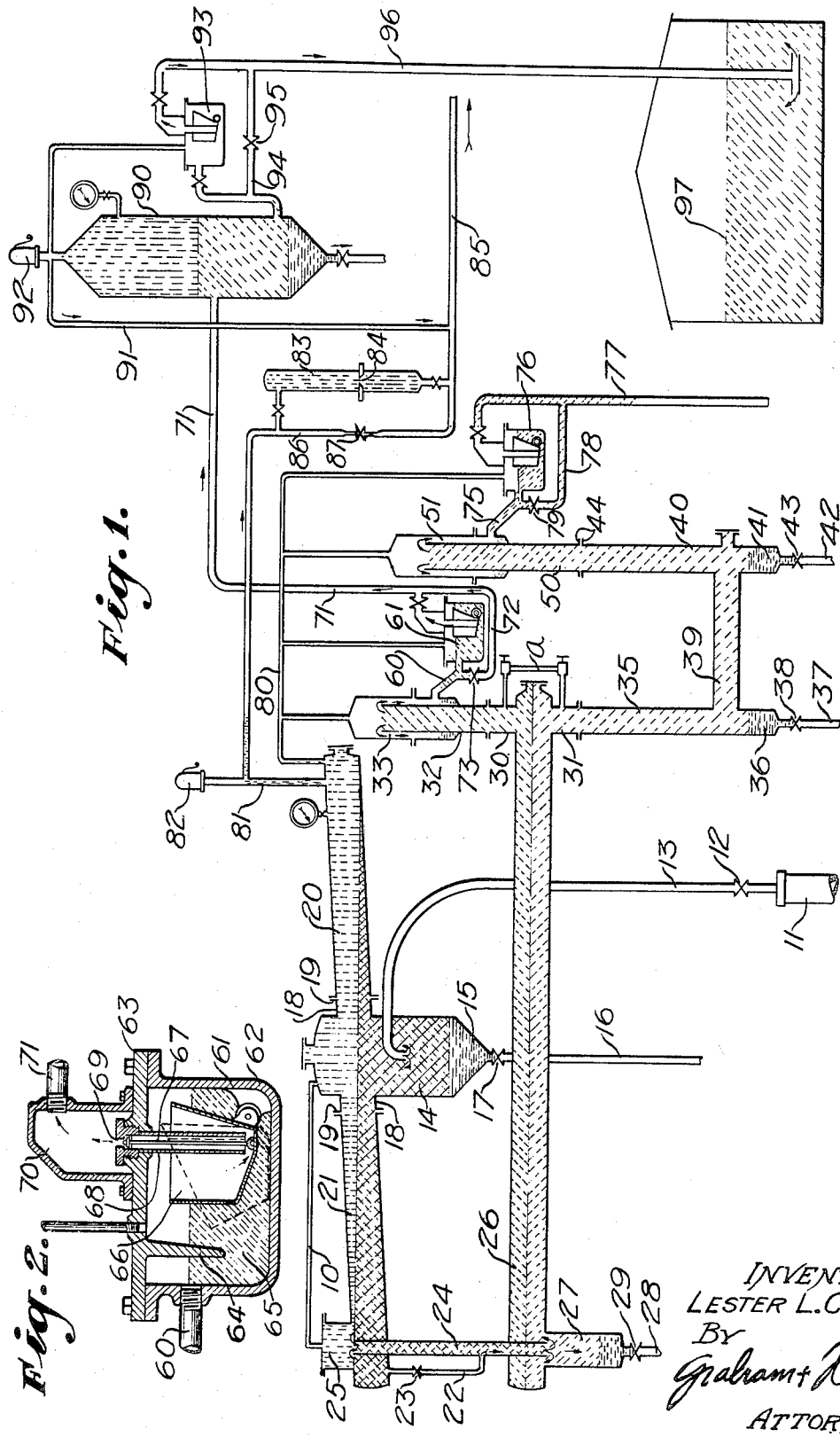
INVENTOR:
LESTER L. CARTER,
By
Graham + Lewis
ATTORNEYS.

Patented Sept. 18, 1923.

1,468,193

UNITED STATES PATENT OFFICE.

LESTER L. CARTER, OF SAN FRANCISCO, CALIFORNIA.

GAS AND WATER SEPARATOR FOR OIL WELLS.

Application filed January 16, 1922. Serial No. 529,655.

*To all whom it may concern:*

Be it known that I, LESTER L. CARTER, a citizen of the United States, residing in the city and county of San Francisco, State of California, have invented a new and useful Improvement in Gas and Water Separators for Oil Wells, of which the following is a specification.

My invention relates to the production of crude petroleum. Crude petroleum as found in nature is often situated in strata or porous sandstone or the like in which water may be found associated with the oil or which may be overlaid with strata containing water. Due to faulty methods of shutting off this water or to the natural replacement of the oil by water from below, many wells produce a mixture of oil and water. This water as found in the ground is ordinarily in the form of large masses of "free" water which would settle out by gravity if no further mixing took place. In a few cases water may be found in the form of very small particles of "trapped" water suspended in the oil to form an emulsion. Such emulsions are often very difficult to separate into their constituent parts and it is highly desirable that their formation be prevented if possible.

Where considerable gas is present in an oil well, the oil ordinarily flows without pumping. It is usually highly desirable in any such flowing well to hold considerable pressure on the flow line from the well, pressures of several hundred pounds per square inch not being uncommon. Since the oil is eventually stored in open tanks, this pressure must, however, eventually be reduced and it is common practice to allow such wells to flow through a "flow nipple" which is a constricted orifice in which the well pressure is reduced by friction to atmospheric pressure or at least to low pressures.

I have found that where oil and free water are allowed to flow at high velocities through such a flow nipple that extremely troublesome emulsions are formed and it is an object of my invention to provide means for separating the oil, water and gas before the pressure is reduced and before any considerable emulsification takes place.

It is also an object of my invention to provide an apparatus for effecting such a separation which apparatus is adapted to withstand high pressures and which may be readily fabricated of readily obtainable materials.

It is a further object of the invention to provide a separator which may be used on a well of variable flow and also to provide a separator which can be largely fabricated from standard pipe sections.

Further objects and advantages will be made evident hereinafter.

Referring to the drawing which is for illustrative purposes only,

Fig. 1 is a diagrammatic view of the apparatus used in the practice of my invention, and Fig. 2 is a section through one of the traps used in the practice of my invention.

In the form of the invention shown, 11 is the casing head of an oil well which discharges into a flow line 13 through a valve 12 which is wide open at all times except when the well is shut off. The flow line 13 is carried into a mud drum 14 which has a cone bottom 15 from which mud may be discharged into a mud line 16 through a main mud drum blow-off valve 17. The mud drum 14 is provided with extensions 18 and flanges 19 to which are connected pipe sections 20 and 21, these pipe sections forming the main gas separating chamber in which may be included the upper portion of the mud drum 14. The ends of the pipes 20 and 21 are closed and the axis of these pipes is preferably inclined to the horizontal as shown in the drawing.

The pipe 21 is normally drained by a small pipe 22 having a valve 23 which communicates with the lower portion of a pipe 24. The upper end of the pipe 24 extends into an overflow chamber 25 and the lower end extends down into a mud drum 27 which communicates with a pipe 26. The mud drum has a blow-off pipe 28 controlled by a valve 29. The valve 23 is set to allow the average flow of the well to pass therethrough, heavy "heads" or surges first filling the pipe 21 to the level shown and rising slightly in the overflow chamber 25, and if too voluminous for the pipe 21 below the level shown, these "heads" are relieved through the pipe 24.

The pipes 20 and 21 will never, even under the above mentioned heavy heads, be filled more than two or three inches above the top of pipe 24, thus always maintaining a gas separating space in the upper part of pipes 20 and 21, mud drum 14, and overflow chamber 25. The top of the overflow chamber 25 is connected to the top of the mud drum 14 by a pressure equalizing pipe 10.

The pipe 26 is preferably nearly horizontal and is closed at either end, the end remote from the pipe being provided with extensions 30 and 31 into which is connected a water-oil gauge *a*. The extension 30 is connected into a constant head oil overflow pipe 32 which extends into an oil overflow chamber 33. The extension 31 is connected to a pipe 35 which terminates at its lower end in an auxiliary mud drum 36 having a blow-off pipe 37 controlled by a valve 38. The pipe 35 is connected by means of a pipe 39 with a pipe 40 which also terminates at its lower end in an auxiliary mud drum 41 having a blow-off pipe 42 controlled by a valve 43. The pipe 40 is connected by means of flanges 44 with a constant head water overflow pipe 50. This pipe projects into a water overflow chamber 51.

The oil overflow chamber 33 is connected by means of a pipe 60 with a trap 61. The trap 61 as shown in Fig. 2 consists of a cast iron shell 62 having a cover 63 on which a deflector 64 is formed. The oil running through the pipe 60 is forced downwardly by the deflector into a central chamber 65 in which a bowl 66 is pivoted. A discharge pipe 68 extends from the top 63 down into the bowl 66 and a valve stem 67 controls a valve 69 in the top 63 so that this valve will be opened whenever the bowl 66 falls into the position shown in dotted lines in Fig. 2. Whenever this occurs, oil is forced upwardly through the pipe 68 into a chamber 70 and outwardly through a pipe 71. The pipe 71 is connected to the pipe 60 by a by-pass pipe 72 having a valve 73 which is normally closed.

The water outlet chamber 51 is connected by a pipe 75 with a trap 76 exactly like the trap 61, the water being discharged into a pipe 77 through the trap 76 or through a by-pass pipe 78 having a valve 79 which is normally closed. The upper portions of the pipe 20, of the chamber 33, of the trap 61, of the chamber 51, and of the trap 76, are maintained at a uniform gas pressure by means of an equalizing pipe system 80 which connects into all of these chambers and traps. The pressure in the tops of these chambers and interior of these traps is, therefore, equal at all times.

The upper portion of the chamber 20 is also connected to a gas outlet pipe 81 having a safety valve 82, this gas outlet pipe communicating with a gas expansion chamber 83. This expansion chamber has a nozzle or flow nipple 84 through which the gas flows and in which it expands, the low pressure gas being delivered to a low pressure gas pipe 85. The nozzle 84 is by-passed by a pipe 86 having a valve 87 which is normally closed. Oil from the trap 61 is delivered through the pipe 71 into a low pressure separator 90 in which a further separation of water, oil, and gas takes place, the gas being delivered through a pipe 91 into the low pressure gas line 85. A low pressure safety valve 92 is provided on the separator 90 and a trap 93 exactly similar to trap 61 is also provided, this trap being by-passed by a pipe 94 controlled by a valve 95. The oil at or near atmospheric pressure is delivered from the trap 93 through a pipe 96 to suitable storage 97.

The method of operation of the invention is as follows:

The oil containing gas, water, sand and other foreign matter is delivered at variable rates of flow into the mud drum 14 which is of considerable area so that a large portion of the solid materials can settle out and be blown off periodically through the line 16. The gas separating chamber provided by the pipes 20 and 21 is maintained under what may be called a high pressure and the most of the gas which will separate at that pressure rises into the upper portion of the pipes 20 and 21 escaping through the line 81. The mixture of water and oil flows to the left from the mud drum 14 and downwardly through the pipe 23 into the auxiliary mud drum 27 in which there is a further collection and separation of solid matter. In the event of excessive flow from the well, oil may flow through the pipe 24. The mixture of water and oil then flows from left to right in the pipe 26. The pipe 26 is of sufficiently large area to allow an effective separation of the oil and water, the oil eventually rising into the pipe 32 and the water moving downwardly into the pipe 35. When the well is flowing, oil continuously discharges from the top of the pipe 32 into the chamber 33.

With the parts of the trap 61 in the position shown in Fig. 2, the valve 69 is closed and oil flows into this trap until it overflows and discharges into the bowl 66 in which event the bowl falls by its own weight into the dotted position and the oil is forced therefrom by the gas pressure through the pipe 68 into the chamber 70 and through the line 71 into the low pressure separating chamber 90. As soon as the bowl and the chamber 65 are sufficiently emptied to bring the level of the oil therein to the level of the rim of the bowl, the oil ceases to flow into the bowl. The oil in the bowl then continues to discharge through the pipe 68 until the oil level in the bowl is almost to the bottom of the pipe 68 when the bowl floats, assuming the position in which it is indicated at 66, and shutting off the flow of oil through the pipe 68. The trap 61, therefore, acts to discharge fluid without allowing gas to escape, the trap serving to maintain a high pressure on the system throughout the separation.

The water flowing downwardly into the pipe 35 through the pipe 39 and upwardly through the pipe 40 deposits a certain amount of solid matter in the auxiliary mud drums 36 and 41 from which it may be removed at periodic intervals through the pipes 37 and 42. This water, however, finally discharges over the top of the pipe 50 and into the chamber 51. The difference in level between the top of the pipe 50 and the top of the pipe 32 is regulated by the relative specific gravity of the oil and water. Since the pipes 40 and 50 are always filled entirely with water, while the pipes 32 and 35 are filled partly with water and partly with lighter oil, it is evident that to produce a hydrostatic balance, the level of the pipe 50 must be below the level of the pipe 32. The water as fast as it overflows is discharged through the trap 76 into the pipe 77.

It may be explained that by-passes are provided on the traps and on the chamber 83 to facilitate repairs. The high pressure gas in the line 81 is allowed to relieve itself and reduce its pressure through the orifice 84. The oil delivered to the pipe 71 being of considerable lower pressure than the initial well pressure is delivered to the chamber 90 in which additional gas is allowed to escape into the line 85. The pressure in the chamber 90 is regulated by the pressure which is maintained on the line 85.

It will be noted that reductions in pressure takes place in the oil in the trap 61, in the water in the trap 76 and in the gas through the orifice 84. This arrangement obviates the necessity of forcing a mixture of gas and oil, or oil and water, through any small orifice in which there is a high velocity. No emulsification of the water, therefore, takes place.

I claim as my invention:

1. In combination: walls forming a gas tight chamber; means for feeding a mixture of oil and water into said chamber; an oil discharge pipe taking oil from said chamber near the top thereof; a water overflow pipe connected at its lower end with the bottom of said gas tight chamber; means closing the top of said water overflow pipe; means for equalizing any gas pressure between the top of said chamber and the space in the top of said pipe; a water discharge pipe taking water from said water overflow pipe at a point slightly below the oil level in said chamber; and means for preventing the escape of gas through said water discharge pipe.

2. In combination: walls forming a gas tight chamber; means for feeding a mixture of oil and water into said chamber; an oil discharge pipe taking oil from said chamber near the top thereof; a water overflow pipe connected at its lower end with the bottom of said gas tight chamber; means closing the top of said water overflow pipe; means for equalizing any gas pressure between the top of said chamber and the space in the top of said pipe; a water discharge pipe taking water from said water overflow pipe at a point slightly below the oil level in said chamber; and a trap which allows liquid to escape through said water discharge pipe but prevents the escape of gas therethrough.

3. In combination: walls forming a gas tight chamber; means for feeding a mixture of oil and water into said chamber; an oil discharge pipe taking oil from said chamber near the top thereof; a trap which allows liquid to escape from said oil discharge pipe but prevents the escape of gas therethrough; a water overflow pipe connected at its lower end with the bottom of said gas tight chamber; means closing the top of said water overflow pipe; means for equalizing any gas pressure between the top of said chamber and the space in the top of said pipe; a water discharge pipe taking water from said water overflow pipe at a point slightly below the oil level in said chamber; and means for preventing the escape of gas through said water discharge pipe.

4. In combination: walls forming a gas tight chamber; means for feeding a mixture of oil and water into said chamber; an oil discharge pipe taking oil from said chamber near the top thereof; a trap which allows liquid to escape from said oil discharge pipe but prevents the escape of gas therethrough; a water overflow pipe connected at its lower end with the bottom of said gas tight chamber; means closing the top of said water overflow pipe; means for equalizing any gas pressure between the top of said chamber and the space in the top of said pipe; a water discharge pipe taking water from said water overflow pipe at a point slightly below the oil level in said chamber; and a trap which allows liquid to escape through said water discharge pipe but prevents the escape of gas therethrough.

In testimony whereof I have hereunto set my hand at San Francisco, California, this 9th day of January, 1922.

LESTER L. CARTER.